(12) United States Patent
Morita

(10) Patent No.: US 6,343,779 B1
(45) Date of Patent: Feb. 5, 2002

(54) WATER DISTRIBUTION PIPING OF GAS-DISSOLVED CLEANING WATER

(75) Inventor: Hiroshi Morita, Tokyo (JP)

(73) Assignee: Kurita Water Industries, Ltd., Tokyo (JP)

( * ) Notice: Subject to any disclaimer, the term of this patent is extended or adjusted under 35 U.S.C. 154(b) by 0 days.

(21) Appl. No.: 09/440,571

(22) Filed: Nov. 15, 1999

(30) Foreign Application Priority Data

Nov. 16, 1998 (JP) ............................................ 10-325627

(51) Int. Cl.[7] .................................................. B01F 3/04

(52) U.S. Cl. .................. 261/23.1; 261/76; 261/DIG. 42

(58) Field of Search .................... 261/23.1, 76, DIG. 42

(56) References Cited

U.S. PATENT DOCUMENTS

| 1,810,131 A | * | 6/1931 | Daily ........................... 261/76 |
| 4,824,614 A | * | 4/1989 | Jones ........................... 261/76 |
| 5,492,655 A | * | 2/1996 | Morton et al. ................. 261/76 |
| 5,670,093 A | * | 9/1997 | Payne ........................... 261/76 |
| 5,904,851 A | * | 5/1999 | Taylor et al. .................. 261/76 |
| 6,074,564 A | * | 6/2000 | Foellmi ...................... 261/23.1 |

* cited by examiner

Primary Examiner—C. Scott Bushey
(74) Attorney, Agent, or Firm—Armstrong, Westerman, Hattori, McLeland & Naughton, LLP

(57) ABSTRACT

A water distribution piping for gas-dissolved cleaning water which distributes cleaning water, made by dissolving gas in pure water, in the presence of gas, the piping having a main pipe and branch pipes, including an in-line mixer immediately upstream of each point at which a branch pipe extends from the main pipe.

16 Claims, 3 Drawing Sheets

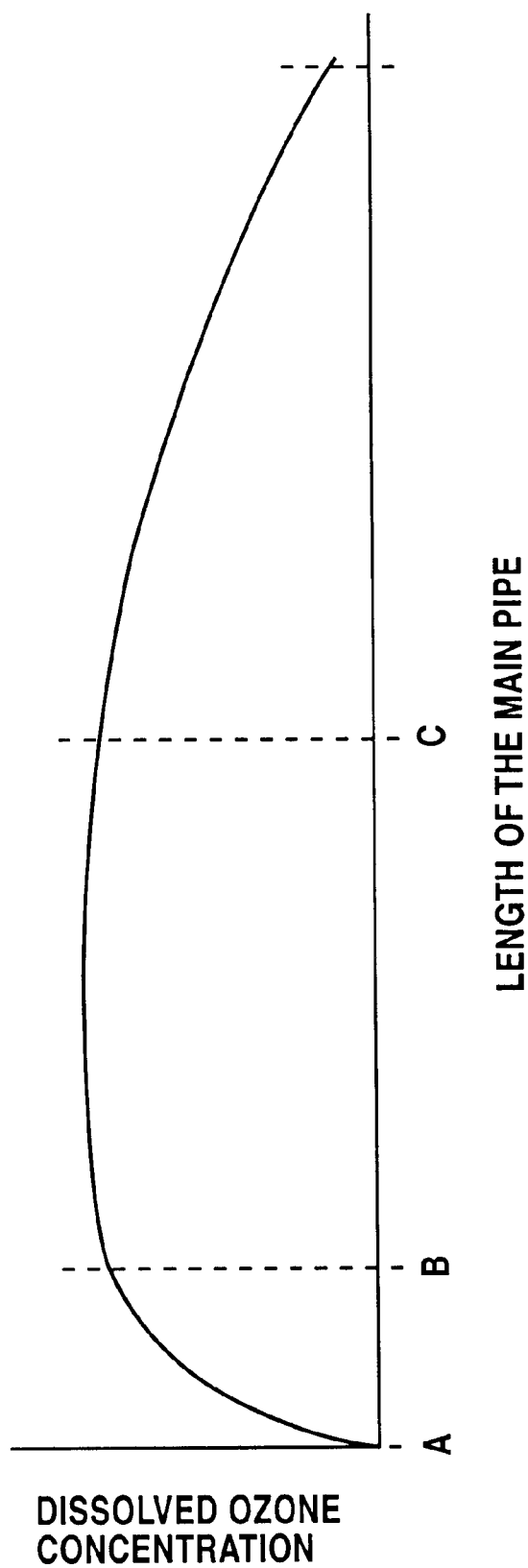

WATER DISTRIBUTION PIPING OF GAS-DISSOLVED CLEANING WATER

BACKGROUND OF THE INVENTION

1. Field of the Invention

This invention concerns water-distribution piping for cleaning water in which gas is dissolved. More specifically, this invention pertains to water distribution piping for gas-dissolved cleaning water, which is capable of distributing cleaning water in which self-decomposing gas is dissolved from a main pipe to branch pipes, having multiple use points over a long distance, while keeping the gas concentration levels at all use points essentially constant.

2. Background of the Invention

Removal of foreign particles from the surface of electronic materials, such as silicon bases for semiconductors, glass bases for liquid crystal, and quartz bases for photomasks, is extremely important to ensure high product quality and low defect rates. Wet cleaning is widely practiced for this purpose. Use of cleaning fluids which have a strong oxidation power is effective for the removal of organic and metal contaminants. Conventionally, high temperature cleaning has been performed using such fluids as a mixture of sulfuric acid and hydrogen peroxide (SPM cleaning fluid) and a mixture of hydrochloric acid, hydrogen peroxide and ultrapure water (SC2 cleaning fluid). In recent years, such wet cleaning processes were questioned because of the tremendous cost of chemicals, the cost of ultrapure water for rinsing, waste fluid treatment cost, and the cost of air conditioning to ventilate chemical vapors and manufacture clean air, as well as ease the affect on the environment, due to enormous water usage, massive chemical disposal, and the release of exhaust gas to the atmosphere, all of which accompany the conventional cleaning methods.

Earlier, the inventors developed gas-dissolved cleaning water for cleaning electronic materials by dissolving ozone in pure water. Cleaning water, made from pure water in which ozone is dissolved, demonstrates extremely powerful oxidation in spite of the low concentration of dissolved ozone, which amounts to only several milligrams per liter. The water is used in processes in which contaminants, namely organic and metal impurities that adhere to the surface of electronic materials, are removed, and other processes in which the surface of silicon bases is oxidized evenly to create a layer of chemical oxidation film. Cleaning water in which ozone is dissolved leaves no residues, and thus keeps the surface of cleaned items cleaned.

This water also has an added advantage of being reusable as it becomes high purity water again after ozone is decomposed or removed. However, dissolved ozone in ozone-dissolved cleaning water self-decomposes over time and becomes oxygen gas. For this reason, distribution of ozone-dissolved cleaning water through a lengthy pipe has been considered to be impractical because of the difficulty of maintaining and controlling the ozone concentration.

In response, the inventors discovered that it is possible to suppress a drop in ozone concentration and distribute water over a long distance by mixing ozone-containing gas and pure water inside the distribution pipe while they are being delivered, and proposed the ozone-dissolved cleaning water supply system, shown in FIG. 1. From an oxygen gas tank 1 and a nitrogen gas tank 2, a mixture of oxygen gas and a minute amount of nitrogen gas is sent to a silent discharge ozonizer 3 to manufacture a gaseous mixture of ozone and oxygen gas, which is sent by an ejector and a pump, etc., into pure water, manufactured by using an ion exchanger, membrane equipment and ultraviolet ray oxidation equipment, etc., at ozone dissolution equipment 4. The gaseous mixture of ozone and oxygen gas mixes with pure water to create a gas-liquid mixture. Ozone dissolves in water to form ozone-dissolved cleaning water which, in the same gas-liquid state, flows down a main pipe 5. Ozone which dissolved in water turns into oxygen gas through self-decomposition. The amount of ozone reduction resulting from self-decomposition is replenished as ozone that is in the gas phase dissolves in the water phase. The result is that the ozone concentration in the water stays essentially constant. Ozone-dissolved cleaning water is taken from branch pipe 6, and consumed at use point 7 after vapor and liquid are separated, by either the gas-liquid separation equipment in a buffer tank 14 or using the property of bubbles to collect at the top part of the pipe. Surplus ozone-dissolved cleaning water which is not taken out from branch pipes is first passed through ozone decomposition equipment 8 to decompose and remove ozone in the water and gas phases, and then led to gas-liquid separation equipment 9 to separate the gas phase from the liquid phase. The gas phase is released to the atmosphere as exhaust gas, and the water phase is recovered as waste water, processed as necessary and reused. This ozone dissolved cleaning water supply system has made it possible to deliver water over a distance of more than 100 m.

This ozone-dissolved cleaning water supply system was developed assuming a simple distribution route, such as one in which ozone-dissolved cleaning water is delivered directly to a use point from the main pipe through a branch. With an increase in the size of electronic material factories in recent years, however, a need has arisen to transport ozone-dissolved cleaning water from the main pipe to branch pipes which have multiple use points. Branch pipes can extend from the main pipe in a number of different ways depending on factory layout. Moreover, branch pipes may, in some situations, need upstands or down pipes, due to locations of other machinery. These variations cause fluctuations in the gas-liquid mixture ratio between ozone-containing gas and pure water inside branch pipes. A problem has thus arisen in that it was difficult to supply cleaning water that has uniform ozone concentration.

3. OBJECT OF THE INVENTION

It is an object of this invention to offer water-distribution piping for gas-dissolved cleaning water which can supply cleaning water, with a nearly constant gas concentration, at all use points even when the cleaning water in which a self-decomposing gas is dissolved is transported over a long distance from the main pipe to branch pipes having multiple use points in a wet cleaning process of electronic materials.

4. SUMMARY OF THE INVENTION

As the result of assiduous research work to solve the above-described problem, the inventors discovered that the installation of an in-line mixer at a point immediately upstream of a branching point at which a branch pipe extends from the main pipe makes it possible to control the gas-liquid mixture ratio between the gas and pure water inside the branch pipe, and supply cleaning water that has a uniform gas concentration.

This invention includes the following:

(1) Water distribution piping for gas-dissolved cleaning water which transports cleaning water, made by dissolving gas in pure water, in the presence of gas, and which has an in-line mixer immediately upstream of the point at which a branch pipe extends from the main pipe;

(2) The above-described water distribution piping for gas-dissolved cleaning water, wherein the gas is a gaseous mixture of ozone and oxygen gas; and (3) The above-described water distribution piping for gas-dissolved cleaning water, wherein the gas-liquid mixture ratio of the fluid which flows down branch pipes is controlled by adjusting the mixing function of in-line mixers and the directions in which branch pipes extend from the main pipe.

5. BRIEF DESCRIPTION OF THE DRAWINGS

FIG. 3 is a graph that explains that mechanism of constant ozone concentration retention.

6. DETAILED DESCRIPTION

The gas-dissolved cleaning water distribution piping of this invention is a water distribution piping that transports cleaning water, which is pure water in which gas is dissolved, in the presence of gas, and includes in-line mixers that are installed immediately upstream of the points at which branch pipes extend from the main pipe. The water distribution piping of this invention is particularly suitable for distributing ozone-dissolved cleaning water, which is prepared by using a gaseous mixture of ozone and oxygen gas.

Figure 1:
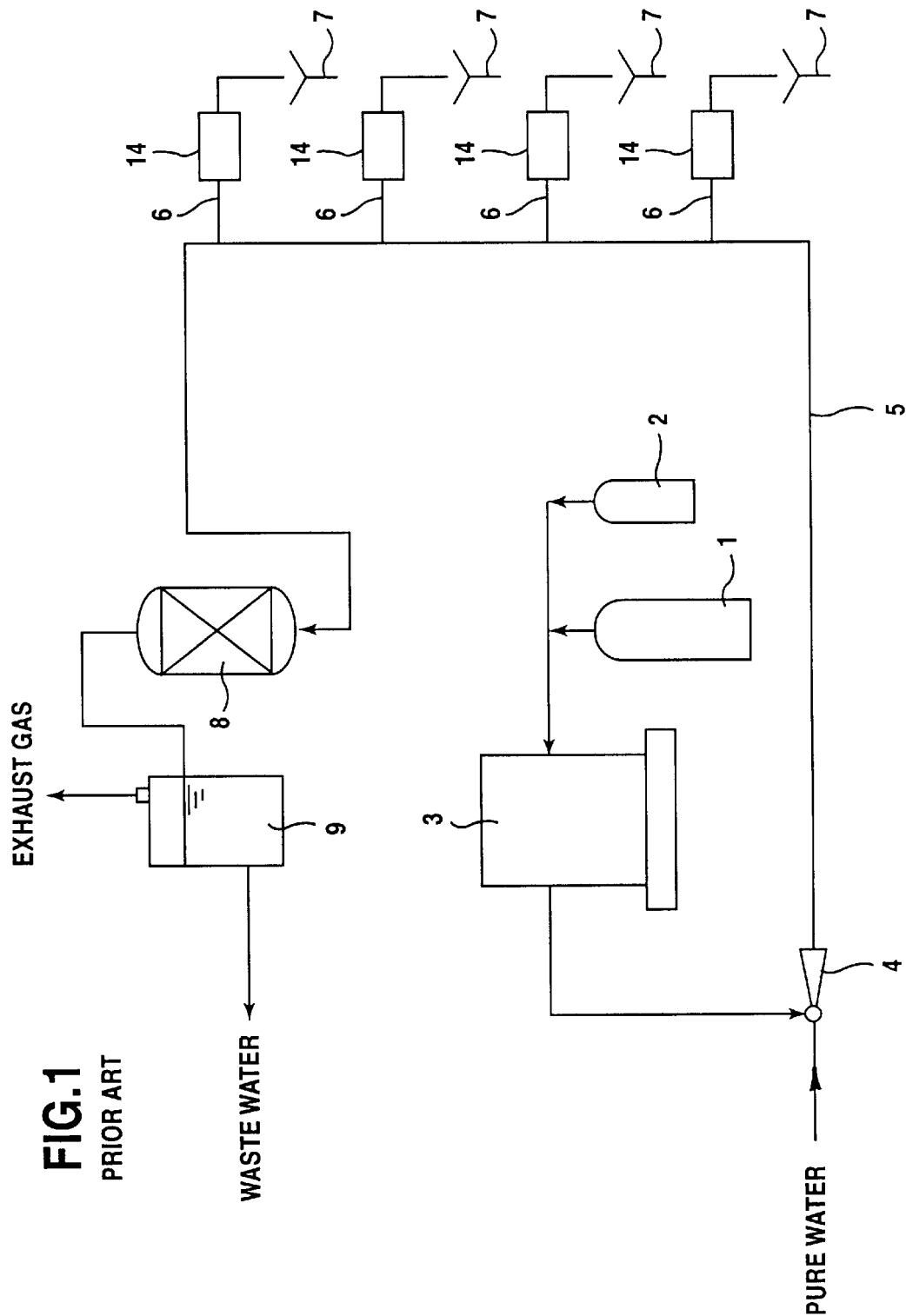
FIG. 1 is a system diagram showing a conventional ozone dissolution cleaning water system.
Figure 2:
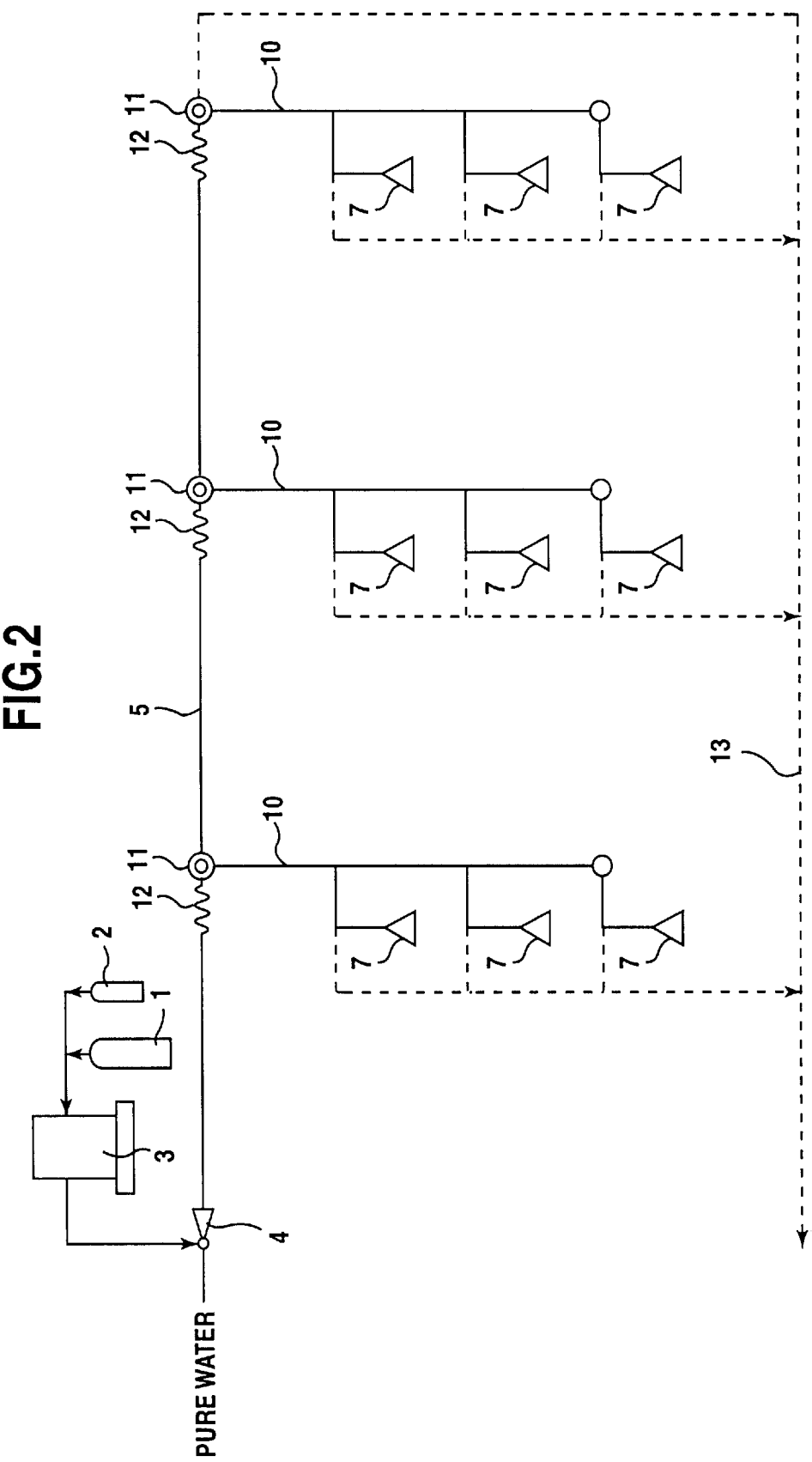
FIG. 2 is a system diagram showing a mode of the water distribution piping for gas-dissolved cleaning water of this invention.

FIG. 2 is a distribution diagram showing an embodiment of a water-distribution piping of this invention. From an oxygen gas tank 1 and a nitrogen gas tank 2, a mixture of oxygen gas and a minute amount of nitrogen gas is sent to a silent discharge ozonizer 3 to manufacture a gaseous mixture of ozone and oxygen gas, which is sent by an ejector and a pump, etc., into pure water that is manufactured by using an ion exchanger, membrane equipment and ultraviolet ray oxidation equipment, etc., at ozone dissolution equipment 4. The gaseous mixture of ozone and oxygen gas mixes with pure water to create a gas-liquid mixture. Ozone dissolves in water to form ozone-dissolved cleaning water which, in the same gas-liquid state, flows through a main pipe 5. The water distribution piping of this invention has an in-line mixer 12 immediately upstream of a branching point 11, where a branch pipe 10 branches off from the main pipe 5. The branch pipe 10 has one or more use points 7. Ozone-dissolved cleaning water that is not used at the use points is recovered through a recovery pipe 13.

There is no particular restriction on the types of ozonizer and gas dissolving equipment used in this invention. An example of an ozonizer, other than the example described above, is ozone generated by a water electrolyzing device. Examples of gas dissolving equipment include ejector-type gas dissolvers, and gas diffusing dissolvers that diffuse gas in pure water, as well as gas permeable membrane-type dissolvers that dissolve gas that is supplied to one side of a gas permeable membrane in pure water that is on the other side of the membrane, through the membrane.

In-line mixers that are used in the water distribution piping of this invention should ideally be those that have high mixing capability, are capable of breaking up gas bubbles that enter the flow in concentration at the top of the main pipe into minuscule bubbles and distributing them evenly in the water, have minimal pressure loss, do not generate too heavy resistance to transportation of cleaning water to distant points, are clean and not inclined to contaminate the water, and have no dead space. Examples of such mixers are static mixers that do not have any driving parts, machine oscillation type ultrasonic mixers, and pipeline mixers with a built-in turbine and a stator. Among these, static mixers that do not have any driving parts are especially suitable because they are easy to maintain and completely free of any possibility of gas-dissolved cleaning water contamination by foreign particles. There is no particular restriction as to the models of static mixers that can be used. Examples are mixers that have multiple elements inserted in a pipe to divide the fluid flow and use the divided flow and the turbulence created by the action for agitation, mixers which contain polygon structures, and mixers which are equipped with multiple elements that have dividing holes to divide and mix by forming a number of division layers. Among these, static mixers of the type that create divided fluid flows can be used most suitably.

When the water distribution piping of this invention is used to distribute ozone-dissolved cleaning water, it is desirable for the in-line mixers to have resistance to ozone. In other words, it is desirable for the in-line mixers not to deteriorate as the result of oxidation by ozone, to be inert to ozone, and not to reduce the dissolved ozone concentration by triggering ozone decomposition. Examples of in-line mixers which possess such resistance to ozone are in-line mixers that are made of either fluororesins such as perfluoroalkoxy resin (PFA), polyvinylidene fluoride (PVDF), polytetrafluoroethylene (PTFE), tetrafluoroethylene-hexafluoropropylene co-polymer (FEP), metals whose surface has been passivated, high purity quartz, or glass.

In the water distribution piping of this invention, an in-line mixer 12 is installed immediately upstream of the branching point 11 at which a branch pipe 10 extends from the main pipe 5. As a result, gas bubbles are broken up into minuscule bubbles and dispersed in the gas-liquid mixture fluid so that the gas-liquid mixture ratio of the fluid in a branch pipe 10 is approximately the same as the gas-liquid mixture ratio of the fluid in the main pipe 5 regardless of the angle at which the branch pipe extends from the main pipe—straight down, horizontal, or straight up.

When the gas that is dissolved in pure water is ozone, the dissolved ozone concentration in the ozone-dissolved cleaning water that flows through the main pipe can be made essentially constant. This is done by transporting the ozone-dissolved cleaning water that flows out of the gas dissolving equipment in the form of a gas-liquid mixture fluid that coexists with gas that contains undissolved ozone. FIG. 3 explains the mechanism of keeping the ozone concentration at a fixed level. In FIG. 3, the horizontal axis represents the length of the main pipe whereas the vertical axis represents the concentration of dissolved ozone. When ozone-containing gas is supplied to pure water at the gas-dissolving equipment A, ozone dissolves in pure water, causing the dissolved ozone concentration to rise rapidly. However, with a rise in the concentration of ozone that is dissolved in pure water, ozone losses due to self-decomposition in the water increase. On the other hand, ozone that exists in a gaseous state is more stable than ozone that is dissolved in water, and thus ozone that exists in undissolved gas that accompanies the water flow dissolves in water. As a consequence, at point B, the amount of ozone that is lost due to self-decomposition in the water balances with the amount of ozone in the accompanying undissolved gas that dissolves in water, allowing the dissolved ozone concentration in the ozone-dissolved cleaning water to remain at an approximately constant level. When ozone-dissolved cleaning water flows further downstream of the main pipe, the amount of ozone in the accompanying undissolved gas decreases. At point C, it becomes difficult for the amount of ozone lost by self-decomposition in the water to remain in equilibrium with the amount of ozone that dissolves in the water from the accompanying undissolved gas. The dissolved ozone concentration begins to taper at this point.

In the water distribution piping of this invention, it is desirable to set up a branching point for a branch pipe between point B and point C on the main pipe. If the condition of the gas-liquid mixture of the fluid in the branch pipe is the same as the condition of the gas-liquid mixture of the fluid in the main pipe, the changes in the dissolved ozone concentration of ozone-dissolved cleaning water that flows through the branch pipe from the branching point becomes identical to the changes in the dissolved ozone concentration of the ozone dissolved water that flows down the main pipe. As a result, ozone-dissolved cleaning water that has a nearly constant concentration is supplied to one or more use points that are set up on the branch pipe. When the gas-liquid mixture fluid in the branch pipe contains only a small amount of ozone-containing gas, the amount of ozone that dissolves in ozone-dissolved cleaning water from the gas phase is small. It then becomes impossible to replenish ozone that is lost through self-decomposition in the ozone-containing cleaning water, and the dissolved ozone concentration in the cleaning water drops rapidly. In the water distribution piping of this invention, an in-line mixer 12 is installed immediately upstream of the point 11 where a branch pipe 10 branches off from the main pipe 5 so as to keep the condition of the gas-liquid mixture fluid in the branch pipe 10 identical to the condition of the gas-liquid mixture fluid in the main pipe 5. As a consequence, the concentration of dissolved ozone in the ozone-dissolved cleaning water that flows through the branch pipe 10 is maintained at a nearly constant level. Even in instances where branch pipes 10 are lengthy and have multiple use points, all use points can be supplied with cleaning water that has an almost constant dissolved ozone concentration.

When gas-dissolved cleaning water is manufactured at one central location and supplied to various use points in a plant through water distribution pipes, the main pipe is often installed in a horizontal position. However, branch pipes that branch off from the main pipe sometimes need to have up stands or downpipes in order to circumvent other piping, wiring or pieces of machinery that are already installed in the plant. Moreover, use points themselves may not necessarily be set up on the same plane as the main pipe. They may be set up at higher or lower positions than the main pipe. In some instances, the main pipe may be installed on the second floor whereas use points may be on the first or the third floor. Even in these situations, it is necessary to supply gas-dissolved cleaning water of uniform gas concentration to all use points.

The water distribution piping for gas-dissolved cleaning water of this invention is capable of controlling the gas-liquid mixture ratio of the fluid that flows through branch pipes 10. This is done by adjusting the mixing function of in-line mixers 12 and the angles that branch pipes 10 form with the main pipe 5. Gas in the gas-liquid mixture fluid tends to collect in the top part of the pipe as it flows. The longer the in-line mixers, the easier it is to break up gas bubbles in the gas-liquid mixture fluid into minute bubbles and distribute them evenly in the water. Consequently, it is desirable to install a long in-line mixer 12 when a branch pipe 10 branches off from the main pipe 5 in a straight upward or downward direction. This ensures that the condition of the gas-liquid mixture of the fluid in the branch pipe equals the condition of the gas-liquid mixture of the fluid in the main pipe. When a branch pipe 10 branches off either upward or downward from the main pipe 5 at a slanted angle, the difference between the condition of the gas-liquid mixture of the fluid in the branch pipe and that of the gas-liquid mixture of the fluid in the main branch is smaller than when the branch pipe 10 extends either straight upward or downward. Thus, the length of the in-line mixers 12 can be shortened in these situations.

Even when a branch pipe 10 extends from the main pipe 5 in a horizontal direction, the angle that the main pipe 5 forms with the branch pipe 10 affects the condition of the gas-liquid mixture of the fluid. In the majority of cases, the angle between the main pipe and branch pipes is 90 degrees. However, angles other than 90 degrees can be used for branch pipes. When the angle formed by the direction of the flow of the fluid in the main pipe and the branch pipe is small, the fluid in the branch pipe has a gas-liquid mixture that is only slightly different from that of the fluid in the main pipe. When the angle between the direction of the flow of the fluid in the main pipe and the branch pipe is large, and the fluid in the branch pipe flows in a double-back shape from the fluid in the main pipe, air bubble distribution to the branch pipe tends to become restricted. In the water distribution piping of this invention, it is desirable to select the model and length of in-line mixers 12 by taking account of these factors.

In the water distribution piping for gas-dissolved cleaning water of this invention, it is possible to control the gas-liquid mixture of the fluid that flows through branch pipes 10, and make intentional adjustments to the concentration of dissolved ozone by using these features. For example, gas bubble distribution to a branch pipe can be made to be highly dependent on the angle of the branch pipe by using a short static mixer and intentionally limiting the break-up of gas bubbles and their distribution so that they are incomplete. When multiple branch pipes are branched off from the main pipe, the uniformity of dissolved ozone concentration can be achieved throughout the water distribution system by reducing gas bubble distribution at branching points that are close to the ozone dissolving equipment, and increasing the gas bubble distribution at branching points that are far away. In other words, uniformity of the dissolved ozone concentration can be achieved by extending branch pipes which branch off at locations close to the ozone dissolving equipment straight downward from the main pipe, and those that branch off at locations far away from the ozone dissolving equipment straight upward from the main pipe. It is also possible to supply cleaning water of varying dissolved ozone concentration levels to different use points even when all the cleaning water is supplied from the same main pipe: use points that require a high concentration of ozone in the cleaning water should be connected to branch pipes which branch off straight upward from the main pipe whereas use points that require a low concentration of ozone in cleaning water should be connected to branch pipes which branch off straight downward from the main pipe.

By using the water distribution piping of gas dissolved cleaning water of this invention, the gas-liquid mixture ratio of the fluid that flows to branch pipes can be controlled at branching points on the main pipe so that the fluid that flows to branch pipes has the same gas-liquid mixture ratio as that in the main pipe. It is thus possible to supply gas-dissolved cleaning water of nearly constant concentration to all use points even when branch pipes are lengthy and have multiple use points.

Taking more aggressive steps, uniformity of the dissolved gas concentration can be achieved at all use points by making adjustments so that the gas-liquid mixture ratio of the fluid that flows to a branch pipe differs on the upstream and downstream portions of the main pipe. Alternatively, cleaning water of varying dissolved gas concentration can be supplied to different use points from one main pipe by making adjustments so that the gas-liquid mixture ratio of the fluid that flows to individual branch pipes varies.

In the following section, this invention is explained in greater detail by using examples. This invention, however, is in no way limited by these examples.

In the examples, a water distribution piping for ozone dissolved cleaning water having the scheme shown in FIG. 2 was used. High purity oxygen gas and high purity nitrogen gas were supplied to an ozonizer [Sumitomo Precision Products, silent discharge ozonizer SG-01CHU]. Ozone-containing gas having an ozone concentration of 71 g/Nm$^3$, and pressure of 0.1 MPa was produced in the ozonizer and injected in an ultrapure water line having the water pressure of 0.25 MPa and the fluid velocity of 20 liter/min. was discharged through an ejector for ozone dissolution. The gas-liquid mixture ratio between the ozone-containing gas and the pure water in the main pipe 5 was set to be 30:70. All gas-liquid mixture ratios are expressed in terms of volume.

The main pipe 5 had an internal diameter ranging between 16 and 25 mm, and was 90 m long. Branch pipes 10 were built at points that were 30 m, 60 m and 90 m away from the ozone dissolution ejector. At all branching points 11, the angle formed by the main pipe 5 and a branch pipe 10 was 90 degrees. Branch pipes 10 had internal diameters ranging between 12 and 16 mm.

All of them were 30 m long. Use points were set up at 10 m, 20 m and 30 m from the branching points on each branch pipe. The end of the 90 m long main pipe 5 was connected to a return pipe 13. Ozone-dissolved cleaning water was passed through each branch pipe 10 at the rate of six liters per minute. All pipes were made of PFA. By adopting the reverse return method, an adjustment was made so that the linear fluid velocity was maintained at a constant level.

A sampling board was placed at the branching points of branch pipes and at their ends in order to measure the gas-liquid mixture ratios at the end of branch pipes and the concentration of dissolved ozone at the branch points as well as at the ends of the branch pipes.

EXAMPLE 1

On the upstream side of each of the three branching points where branch pipes branched off from the main pipe, a 100 cm-long static mixer was installed.

The ozone concentration of the ozone-dissolved cleaning water that flowed through the main pipe was 7.5 mg/liter at 30 meters from the ozone dissolution ejector, 6.0 mg/liter at 60 meters, and 5.0 mg/liter at 90 meters.

Each branch pipe was extended straight downward from the main pipe, turned in a horizontal direction at 0.5 m from the main pipe, turned straight upward at 0.5 m, turned horizontally again at 0.5 m, and stretched in a straight horizontal direction for 28.5 m. The gas-liquid mixture ratio and the ozone concentration of the branch pipe that branched off at 30 m from the ozone dissolution ejector were 30:70 and 6.0 mg/liter respectively. Those of the branch pipe that branched off at 60 m were 30:70 and 5.0 mg/liter respectively. Those of the branch pipe that branched off at 90 m were 30:70 and 4.3 mg/liter respectively.

Next, branch pipes were extended from the main pipe in a horizontal direction and the entire 30 meters of the branch pipes were stretched in a straight line. The branch pipe that branched off at 30 m from the ozone dissolution ejector had a gas-liquid mixture ratio of 30:70.

Finally, branch pipes were extended straight upward from the main pipe, turned horizontally at 0.5 m from the main pipe, then turned straight downward at 0.5 m, and the remaining 28.5 m of the branch pipes were stretched in a straight line in a horizontal direction at 0.5 m. The gas-liquid mixture ratio of the branch pipe that branched off at 30 m from the ozone dissolution ejector was 30:70.

EXAMPLE 2

The same manipulation as in Example 1 was performed with the exception of the length of the static mixers, which was changed to 50 cm.

When the branch pipes were extended straight downward from the main pipe, the gas-liquid mixture ratio and the ozone concentration of the branch pipe that branched off at 30 m from the ozone dissolution ejector were 25:75 and 5.5 mg/liter. The branch pipe that branched off at 60 m had a gas-liquid mixture ratio of 25:75 and the ozone concentration of 4.3 mg/liter. The branch pipe that branched off at 90 m had a gas-liquid mixture ratio of 25:75 and the ozone concentration of 3.5 mg/liter.

When the branch pipes were extended in a horizontal direction from the main pipe, the gas-liquid mixture ratio of the branch pipe that branched off at 30 m from the ozone dissolution ejector was 30:70. The branch pipe that branched off at 60 m had a gas-liquid mixture ratio of 30:70 and the ozone concentration of 5.0 mg/liter.

When the branch pipes were extended straight upward from the main pipe, the gas-liquid mixture ratio of the branch pipe that branched off at 30 m from the ozone dissolution ejector was 35:65. The branch pipe that branched off at 90 m had a gas-liquid mixture ratio of 35:65 and the ozone concentration of 4.7 mg/liter.

EXAMPLE 3

The same manipulation as in Example 1 was performed with the exception of the length of the static mixers, which was changed to 20 cm.

When the branch pipes were extended straight downward from the main pipe, the gas-liquid mixture ratio and the ozone concentration of the branch pipe that branched off at 30 m from the ozone dissolution ejector were 15:85 and 3.3 mg/liter. The branch pipe that branched off at 60 m had a gas-liquid mixture ratio of 15:85 and the ozone concentration of 2.5 mg/liter. The branch pipe that branched off at 90 m had a gas-liquid mixture ratio of 15:85 and the ozone concentration of 2.0 mg/liter.

When the branch pipes were extended in a horizontal direction from the main pipe, the gas-liquid mixture ratio of the branch pipe that branched off at 30 m from the ozone dissolution ejector was 25:75.

When the branch pipes were extended straight upward from the main pipe, the gas-liquid mixture ratio of the branch pipe that branched off at 30 m from the ozone dissolution ejector was 40:60.

Comparative Example 1

The same manipulation as in Example 1 was performed except for the fact that no static mixers were used.

When the branch pipes were extended straight downward from the main pipe, the gas-liquid mixture ratio and the ozone concentration of the branch pipe that branched off at 30 m from the ozone dissolution ejector were 0:100 and 1.5 mg/liter respectively. The branch pipe that branched off at 60 m had a gas-liquid mixture ratio of 0:100 and the ozone concentration of 1.2 mg/liter. The branch pipe that branched off at 90 m had a gas-liquid mixture ratio of 0:100 and the ozone concentration of 1.0 mg/liter.

When the branch pipes were extended in a horizontal direction from the main pipe, the gas-liquid mixture ratio of the branch pipe that branched off at 30 m from the ozone dissolution ejector was 10:90.

When the branch pipes were extended straight upward from the main pipe, the gas-liquid mixture ratio of the branch pipe that branched off at 30 m from the ozone dissolution ejector was 50:50.

EXAMPLE 4

On the upstream side of each of the three branching points were branch pipes branched off from the main pipe, a 20 cm-long static mixer was installed.

Each branch pipe was extended from the main pipe downward at a 30 degree angle from the horizontal direction, turned in the horizontal direction at 0.5 m from the main pipe, then turned upward at a 30 degree angle at 0.5 m, turned horizontally again at 0.5 m, and stretched out straight in the horizontal direction for 28.5 m, the remaining length of the branch pipe. The gas-liquid mixture ratio and the ozone concentration of the branch pipe that branched off at 30 m from the ozone dissolution ejector were 22:78 and 4.6 mg/liter respectively.

Next, branch pipes were extended upward from the main pipe at a 30 degree angle from the horizontal direction, turned in the horizontal direction at 0.5 m from the main pipe, then turned downward at a 30 degree angle at 0.5 m, turned horizontally again at 0.5 m, and stretched straight in the horizontal direction for 28.5 m, the remaining length of the branch pipe. The branch pipe that branched off at 30 m from the ozone dissolution ejector had a gas-liquid mixture ratio of 28:72. The branch pipe that branched off at 60 m had a gas-liquid mixture ratio of 28:72 and an ozone concentration of 4.8 mg/liter.

Finally, the branch pipes were extended upward at a 45 degree angle from the main pipe, turned horizontally at 0.5 m from the main pipe, then turned downward at a 45 degree angle at 0.5 m, turned horizontally again at 0.5 m, and stretched straight in the horizontal direction for 28.5 m, the remaining length of the branch pipe. The branch pipe that branched off at 30 m from the ozone dissolution ejector had a gas-liquid mixture ratio of 35:65. The branch pipe that branched off at 90 m had a gas-liquid mixture ratio of 35:65 and an ozone concentration of 4.7 mg/liter.

Table 1 shows the gas-liquid mixture ratios which were obtained in Examples 1 through 4 and Comparative Example 1.

TABLE 1

| | Length of Static Mixer (cm) | Location of Branching Point. (m) | Gas-Liquid Mixture Ratio (Volumetric Ratio) | | |
|---|---|---|---|---|---|
| | | | Straight Downward | Horizontal | Straight Upward |
| Example 1 | 100 | 30 | 30:70 | 30:70 | 30:70 |
| | | 60 | 30:70 | — | — |
| | | 90 | 30:70 | — | — |
| Example 2 | 50 | 30 | 25:75 | 30:70 | 35:65 |
| | | 60 | 25:75 | 30:70 | — |
| | | 90 | 25:75 | — | 35:65 |
| Example 3 | 20 | 30 | 15:85 | 25:75 | 40:60 |
| | | 60 | 15:85 | — | — |
| | | 90 | 15:85 | — | — |
| Comparative Example 1 | None | 30 | 0:100 | 10:90 | 50:50 |
| | | 60 | 0:100 | — | — |
| | | 90 | 0:100 | — | — |

| | | | Downward at 30 Degree Angle | Upward at 30 Degree Angle | Upward at 45 Degree Angle |
|---|---|---|---|---|---|
| Example 4 | 20 | 30 | 22:78 | 28:72 | 35:65 |
| | | 60 | — | 28:72 | — |
| | | 90 | — | — | 35:65 |

Table 1 shows that in Example 1, in which 100 cm-long static mixers were used, gas bubbles were broken up and dispersed at branching points and the gas-liquid mixture ratios in the branch pipes were equal to that of the main pipe. When the length of the static mixers is shortened, as done in Examples 2 and 3, dispersion of gas bubbles at branching points becomes incomplete. The ratio of gas bubbles in the upper portion of the main pipe increases, and the gas-liquid mixture ratios in the branch pipes change, depending on the angles of the branch pipes. When no static mixers are used, as in Comparative Example 1, the concentration of gas bubbles in the upper part of the main pipe becomes marked, making it impossible for air bubbles to be led to branch pipes that extend straight downward. In Example 4, static mixers of the same length as those used in Example 3 were used. However, the gas-liquid mixture ratios in Example 4 were closer to that of the main pipe than in Example 3 because the branch pipes were not turned straight upward or downward. This reveals that the gas-liquid mixture ratio of the fluid in branch pipes can be adjusted by varying the length of static mixers and the angle of branch pipes.

Table 2 shows the ozone concentrations obtained in Examples 1 through 4 and Comparative Example 1.

TABLE 2

| | Length of Static Mixer (cm) | Location of Branching Point (m) | Ozone Concentration (mg/liter) | | |
|---|---|---|---|---|---|
| | | | Straight Downward | Horizontal | Straight Upward |
| Example 1 | 100 | 30 | 6.0 | — | — |
| | | 60 | 5.0 | — | — |
| | | 90 | 4.3 | — | — |
| Example 2 | 50 | 30 | 5.5 | — | — |
| | | 60 | 4.3 | 5.0 | — |
| | | 90 | 3.5 | — | 4.7 |
| Example 3 | 20 | 30 | 3.3 | — | — |
| | | 60 | 2.5 | — | — |
| | | 90 | 2.0 | — | — |
| Comparative Example 1 | None | 30 | 1.5 | — | — |
| | | 60 | 1.2 | — | — |
| | | 90 | 1.0 | — | — |

TABLE 2-continued

| | Length of Static Mixer (cm) | Location of Branching Point (m) | Ozone Concentration (mg/liter) | | |
|---|---|---|---|---|---|
| | | | Downward at 30 Degree Angle | Upward at 30 Degree Angle | Upward at 45 Degree Angle |
| Example 4 | 20 | 30 | 4.6 | — | — |
| | | 60 | — | 4.8 | — |
| | | 90 | — | — | 4.7 |

[Note] Ozone concentration at branching points on the main pipe: 30 m -- 7.5 mg/liter; 60 m -- 6.0 mg/liter; 90 m -- 5.0 mg/liter.

Table 2 shows that in Example 1, in which 100 cm-long static mixers were installed, gas bubbles were broken up and dispersed at branching points, and high ozone concentration was maintained at the end of each branch pipe that extends straight downward. When the length of the static mixers is shortened, as in Example 2, gas bubble dispersion at branching points becomes incomplete, causing the ratio of gas bubbles in the upper part of the main pipe to rise. High ozone concentration is obtained when branch pipes are extended in a horizontal direction or straight upward. Low ozone concentration results when branch pipes extend straight downward. Ozone concentration at the end of branch pipes that are extended straight downward becomes even lower when the length of static mixers is further shortened as in Example 3. When no static mixers are used, as in Comparative Example 1, gas bubbles collect in the upper part of the main pipe. As a result, ozone concentration at the end of the branch pipes that extend straight downward becomes extremely low. In Example 4, the same length static mixers as those used in Example 3 were used. However, ozone concentration is higher than in Example 3 because the branch pipes do not point straight upward or downward. This reveals that the ozone concentration of ozone-dissolved cleaning water that flows through branch pipes can be adjusted by varying the length of the static mixers and the angles of branch pipes.

By using the water distribution piping for gas-dissolved cleaning water of this invention, the gas-liquid mixture ratios of the fluid that enters branch pipes can be controlled at branching points on the main pipe so that gas-liquid mixture fluid that has the same gas-liquid mixture ratio as that in the main pipe can be sent to branch pipes. For this reason, gas-dissolved cleaning water of a nearly constant concentration can be supplied to all use points even when lengthy branch pipes are extended from the main pipe and multiple use points are set up on these branch pipes.

Taking more aggressive steps, it is possible to achieve uniformity of dissolved gas concentration at all use points by making adjustments so that the gas-liquid mixture ratios of the fluid that enters branch pipes differ on the upstream and downstream portions of the main pipe. Alternatively, by making adjustments so that the gas-liquid mixture ratios of the fluid that enters individual branch pipes differ from one another, cleaning water having varying dissolved gas concentration levels can be supplied to individual use points from the same main pipe.

What is claimed is:

1. A water distribution piping for ozone gas-dissolved cleaning water which distributes cleaning water, made by dissolving ozone gas in pure water, in the presence of a gaseous mixture of ozone and oxygen gas, the water distribution piping including a main pipe and a plurality of branch pipes extending from the main pipe, comprising:

an in-line mixer immediately upstream of each point at which a branch pipe extends from the main pipe, wherein a gas liquid mixture ratio of the fluid which flows through each said branch pipe is determined by adjusting a mixing function of said in-line mixer and adjusting an angle at which said branch pipe extends from the main pipe, so as to keep the ozone concentration of the cleaning water at all points of use along each branch pipe at a desired use level.

2. The water distribution piping for ozone gas-dissolved cleaning water as described in claim 1, wherein said in-line mixer is a static mixer.

3. The water distribution piping for ozone gas-dissolved cleaning water as described in claim 1, wherein said in-line mixer is inert to ozone.

4. The water distribution piping for ozone gas-dissolved cleaning water as described in claim 3, wherein said in-line mixer is made from a material selected from the group consisting of:

fluororesins, metals whose surface has been passivated, high purity quartz, and glass.

5. A water distribution piping for ozone gas-dissolved cleaning water which distributes cleaning water, made by dissolving ozone gas in pure water, in the presence of a gaseous mixture of ozone and oxygen gas, the water distribution piping including a main pipe and a plurality of branch pipes extending from the main pipe, comprising:

an in-line mixer immediately upstream of each point at which a branch pipe extends from the main pipe, wherein a gas-liquid mixture ratio of the fluid which flows through each said branch pipe is controlled by setting a constant mixing function of said in-line mixer and adjusting an angle at which said branch pipe extends from the main pipe, so as to keep the ozone concentration of the cleaning water at all points of use along each branch pipe at a desired use level.

6. The water distribution piping for ozone gas-dissolved cleaning water as described in claim 5, wherein said in-line mixer is a static mixer.

7. The water distribution piping for ozone gas-dissolved cleaning water as described in claim 5, wherein said in-line mixer is inert to ozone.

8. The water distribution piping for ozone gas dissolved cleaning water as described in claim 7, wherein said in-line mixer is made from a material selected from the group consisting of:

fluororesins, metals whose surface has been passivated, high purity quartz, and glass.

9. A water distribution piping for ozone gas-dissolved cleaning water which distributes cleaning water, made by dissolving ozone gas in pure water, in the presence of a gaseous mixture of ozone and oxygen gas, the water distribution piping including a main pipe and a plurality of branch pipes extending from the main pipe, comprising:

an in-line mixer immediately upstream of each point at which a branch pipe extends from the main pipe, so as to keep the ozone concentration of the cleaning water at all points of use along each branch pipe at a desired use level, wherein unused gaseous mixture of ozone and oxygen gas and cleaning water at all use points along each branch pipe is recovered through a recovery pipe to be reused.

10. The water distribution piping for ozone gas-dissolved cleaning water as described in claim 9, wherein said in-line mixer is a static mixer.

11. The water distribution piping for ozone gas-dissolved cleaning water as described in claim 9, wherein said in-line mixer is inert to ozone.

12. The water distribution piping for ozone gas-dissolved cleaning water as described in claim 11, wherein said in-line mixer is made from a material selected from the group consisting of: fluororesins, metals whose surface has been passivated, high purity quartz, and glass.

13. A water distribution piping for ozone gas-dissolved cleaning water which distributes cleaning water, made by dissolving ozone gas in pure water, in the presence of a gaseous mixture of ozone and oxygen gas, the water distribution piping including a main pipe and a plurality of branch pipes extending from the main pipe, comprising:

an-in-line mixer immediately upstream of each point at which a branch pipe extends from the main pipe, wherein a gas-liquid mixture ratio of the fluid which flows through each said branch pipe is determined by setting a constant mixing function of said in-line mixer and fixing a specified angle at which said branch pipe extends from the main pipe, so as to keep the ozone concentration of the cleaning water at all points of use along each branch pipe at a desired level, and wherein unused gaseous mixture of ozone and oxygen gas and cleaning water at all use points along each branch pipe is recovered through a recovery pipe to be reused.

14. The water distribution piping for ozone gas-dissolved cleaning water as described in claim 13, wherein said in-line mixer is a static mixer.

15. The water distribution piping for ozone gas-dissolved cleaning water as described in claim 13, wherein said in-line mixer is insert to ozone.

16. The water distribution piping for ozone gas-dissolved cleaning water as described in claim 15, wherein said in-line mixer is made from a material selected from the group consisting of:

fluororesins, metals whose surface has been passivated, high purity quartz, and glass.

\* \* \* \* \*